3,274,234
PROCESS FOR PREPARING $C_{1-6}$ ALKYL
PHENYLCYCLOHEXYLGLYCOLATES
Louis Spiegler, Woodbury, N.J., assignor to E. I. du Pont de Nemours and Company, Wilmington, Del., a corporation of Delaware
No Drawing. Filed Mar. 26, 1963, Ser. No. 267,945
3 Claims. (Cl. 260—473)

This invention is directed to a process for the preparation of alkyl phenylcyclohexylglycolates by the catalytic hydrogenation of alkyl benzilates in the presence of rhodium as a catalyst.

A number of phenylcyclohexylgylcolic acid derivativese are well known for their pharmacological activity. The alkyl esters of phenylcyclohexylglycolic acid are especially valuable as spasmolytic agents exhibiting low toxicity. They are also essential intermediates in the preparation of salts of aminoalkyl esters of phenylcyclohexylgylcolic acid, which are useful anticholinesterase agents.

The phenylcyclohexylglycolates have previously been prepared by the Grignard reaction, which comprises condensing cyclohexyl magnesium chloride with a phenylglyoxylate, as described, for example, in U.S. 2,961,461. However, Grignard processes are recognizably expensive when used on a commercial scale.

These compounds have also been prepared by partial reduction of benzilic acid or its esters. The reduction comprises catalytic hydrogenation of the benzilic compound in the presence of large amounts of platinum oxide in acetic acid medium. Yields of 50–55% have been obtained by this method [J. Am. Chem. Soc. 74, 1485 (1952)]. It has also been reported that hydrogenation with platinum oxide in acetic acid, ethyl acetate or in ethanolic hydrochloric acid gave a mixture of products containing principally the starting material [J. Am. Chem. Soc 78, 3701 (1956)]. Still other information given in the literature states that hydrogenation of benzilic acid derivatives with platinum oxide in acetic acid gives mainly dicyclohexylglycolic acid [J. Am. Chem. Soc. 71, 3772 (1949)]. These references to the undependable and erratic behavior of platinum oxide do not teach its use in commercial preparation of phenylcyclohexylglycolic acid derivatives. In addition, the corrosive nature of acetic acid solution requires special acid-resistant hydrogen reduction equipment and large amounts of platinum which add considerably to the cost of large scale manufacture.

Hydrogenation of benzilic acid over Raney nickel effects removal of the hydroxyl group to form dicyclohexylacetic acid [J. Am. Chem. Soc. 71, 3772 (1949)]. Hydrogenation of methyl benzilate in ethyl alcohol in the presence of a nickel or cobalt catalyst results in dehydroxylation as well as ring hydrogenation (British Patent 549,871). It can thus be seen that the activity of catalysts in this process is unpredictable.

It has now been discovered that alkyl benzilates can be selectively hydrogenated easily to the alkyl phenylcyclohexylglycolates in aqueous medium in the presence of a rhodium catalyst.

The use of a rhodium catalyst has been described for the ring hydrogenation of some mono-cyclic aromatic compounds (U.S. 2,675,390). Rhodium is considered to be a more highly active catalyst than either platinum or nickel, since it effects rapid and more efficient hydrogenation of cyclic compounds which are slowly or difficultly hydrogenated with platinum or nickel. With respect to this higher activity of rhodium, it is surprising and unexpected that selective hydrogenation of polycyclic compounds can be achieved. By selective hydrogenation is meant saturation of only one phenyl ring. It is further unexpected that only one ring of the alkyl benzilate is hydrogenated without accompanied dehydroxylation or decarboxylation and with minimum formation of undesirable by-products.

It is, therefore, an object of this invention to provide a novel and significantly useful process for the manufacture of alkyl phenylcyclohexylgylcolates.

It is a further object to provide a commercially operable process wherein selective hydrogenation is achieved with minimum formation of by-products. Another object is to provide such a process in which the hydroxyl and carboxyl groups are not split off during the hydrogenation.

These and other objects will become apparent in the following specification and claims.

More specifically, the present invention is directed to a process for the preparation of a $C_{1-6}$ alkyl phenylcyclohexylglycolate, which process comprises treating a $C_{1-6}$ alkyl benzilate at a temperature and pressure sufficient to liquefy the alkyl benzilate with hydrogen in an aqueous medium in the presence of a rhodium based catalyst and recovering the resulting alkyl phenylcyclohexylglycolate.

In practicing the present invention, the following procedure may be utilized. A pressure vessel equipped with agitator is charged with the alkyl benzilate, water and rhodium catalyst. Air is flushed out of the system with nitrogen, followed by hydrogen to replace the nitrogen. The charge is heated to a temperature of 75° to 125° C., preferably 100° to 125° C., with agitation. Hydrogen pressure is applied at this temperature until rapid absorption of hydrogen ceases. The charge is cooled and the bottom organic layer is dehydrated, preferably by azeotropic distillation with a solvent, such as benzene, hexane, cyclohexane, toluene, etc. Alternatively, the bottom organic layer may be diluted with a water-miscible solvent, such as acetone, ethanol, dioxane, dimethylformamide, etc. By either procedure, the solvent solution is filtered to recover the catalyst. Finally, the product is recovered by removal of the solvent by evaporation or distillation.

The reaction rate is influenced by the amount of catalyst, temperature, pressure. The conditions specified in the memorandum are a combination which produces optimum results without going to extremes. The reaction will go, on the whole, satisfactorily beyond the limits specified for any one parameter, providing the others are adjusted accordingly.

Below 75° C. the reaction rate is slow—other factors remaining the same. The reaction will go quite satisfactorily even up to about 150° C., but at a temperature much above 150° C., both rings may be hydrogenated and side reactions may occur.

The amount of catalyst is not critical. One may even use as little as 0.5% at higher temperatures and pressures. The reaction proceeds very well with less than 4% catalyst, therefore it is unnecessary and uneconomical to use large quantities.

Use of pressures above 100 p.s.i.g. requires expensive high pressure equipment. Pressures below 25 to 50 p.s.i.g. are not practical.

It is desirable to use not more than 20% excess of hydrogen to avoid hydrogenation of the second ring, preferably just about the theoretical quantity. Even less than theory is satisfactory for the reason that underhydrogenated material may be recycled, while overhydrogenated material is lost, resulting in a low yield.

The hydrogen pressure which may be applied varies from (25 to 50) to 100 p.s.i.g. as heretofore described. The total amount of hydrogen introduced is about the theoretical amount to hydrogenate one aromatic ring. Generally, a slight deficiency or slight excess is not harmful. An excess of up to 20% more than theoretical may be used.

The amount of water used is not critical. There should be enough water to produce a stirrable reaction mass. About 10 to 500% of water by weight of the alkyl benzilate is sufficient.

The catalyst may be rhodium metal or preferably rhodium metal deposited on a support such as activated carbon. It is prepared in the known way of preparing supported catalysts, that is, by treating the carbon with a solution of suitable rhodium compound and reducing to form a deposit of rhodium metal on the carbon. A commercially available supported rhodium catalyst which may be used advantageously consists of about 5% of rhodium metal deposited on an activated carbon support. The amount of catalyst suitable for the practice of this invention comprises about 1.5% to 4% of the supported catalyst by weight of the alkyl benzilate to be hydrogenated under pressure, preferably 2%–3%. Slightly more catalyst is desired when operating at atmospheric pressure, 8–15% of catalyst by weight of alkyl benzilate being preferred.

Hydrogenation is effectively achieved in a length of time varying from about 10 to 30 hours. When the temperature is maintained at about 100° to 120°, the reaction is complete in about 15 to 18 hours. Longer contact times are necessary at lower temperatures and atmospheric pressure.

The alkyl benzilates which are the starting materials of the process of the invention are the alkyl esters of benzilic acid, which contain 1 to 6 carbon atoms in the alkyl radical. The methyl and ethyl benzilates are commercially available compounds, while the higher esters, namely the propyl, butyl, pentyl and hexyl benzilates may be easily obtained by esterification of commercially available benzilic acid using standard procedures of esterification of organic carboxylic acids, such as refluxing the acid and the alcohol with a small amount of sulfuric acid, hydrogen chloride or an arylsulfonic acid.

The rhodium catalyst utilized in the practice of this invention is preferably rhodium supported on carbon, as described in U.S. 2,675,390 and 2,878,254. The preferred catalyst is that described in 2,878,254, as 5% rhodium on carbon, available from Baker and Co., Newark 5, N.J. Other supports for the rhodium which would also be satisfactory include alumina, kieselguhr and other inert inorganic supports.

The following examples are representative and illustrate the novel process of the present invention.

Example 1

An electrically heated autoclave equipped with agitator was charged with 1000 parts of methyl benzilate, 500 parts of distilled water and 40 parts of a rhodium catalyst consisting of 5% rhodium on activated carbon. The autoclave was flushed out with nitrogen to displace air in the system, then with hydrogen to displace the nitrogen. The charge was heated to 100°±2° C. with agitation. Hydrogen pressure of 100 lbs. was applied at this temperature until practically no further hydrogen absorption occurred. After cooling, the charge was removed from the autoclave, and the water layer separated by decantation from an emulsified black, oily layer which contained the hydrogenated product, catalyst and water. The water was removed from this layer by the addition of benzene and azeotropic distillation. The dry benzene solution of the product was filtered to recover the catalyst. Good quality, water-white methyl phenylcyclohexylglycolate, 1025 parts or 99.4% yield, was obtained by evaporation of the benzene from the clarified filtrate. The infrared spectrum of the crude topped product was essentially identical with the spectrum obtained from authentic methyl phenylcyclohexylglycolate except for minor bands corresponding to small amounts of the methyl dicyclohexylglycolate.

Example 2

A glass-lined reaction kettle equipped with a propeller agitator was charged with a suspension of 50 parts of methyl benzilate in 150 parts of water and 4 parts of a catalyst consisting of 5% rhodium supported on activated carbon. The kettle was heated to 80°±2° C. and hydrogen was introduced at atmospheric pressure using vigorous agitation. After about 13.5 hours essentially the theoretical amount of hydrogen was absorbed. The reaction mixture was cooled and the organic layer separated from the aqueous layer. The organic layer was dried as described in Example 1. The crude topped product was fractionally distilled under diminished pressure yielding 33.5 parts of approximately 90% purity of methyl phenylcyclohexylglycolate containing small amounts of methyl benzilate and methyl dicyclohexylglycolate and 7.6 parts of 80% purity containing 18% of methyl benzilate and dicyclohexylglycolate as impurities.

By following the procedure in the above examples, the ethyl, propyl, butyl, pentyl and hexyl esters of phenylcyclohexylglycolate are prepared.

The process of the invention thus provides a novel and significantly useful procedure for the preparation of alkyl phenylcyclohexylglycolates with minimum formation of undesirable by-products. A further advantage is that standard hydrogenation equipment may be utilized since the reaction is conducted in water as the solvent medium and not in a corrosive, acid solvent.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing a $C_{1-6}$ alkyl phenylcyclohexylglycolate, which process comprises the steps of (a) treating a $C_{1-6}$ alkyl benzilate at a temperature within the range of 75° C. to about 150° C. and pressure sufficient to liquefy said benzilate with hydrogen in water in the presence of a rhodium based catalyst and (b) recovering the resulting alkyl phenylcyclohexylglycolate.

2. A process according to claim 1 wherein methyl phenylcyclohexylglycolate is prepared from methyl benzilate.

3. A process for preparing a $C_{1-6}$ alkyl phenylcyclohexylglycolate, which process comprises the steps of (a) treating a $C_{1-6}$ alkyl benzilate at a temperature within the range of 75° C. to about 150° C. and a pressure sufficient to liquefy said benzilate with hydrogen in water in the presence of a rhodium based catalyst with the proviso that (1) when said pressure is superatmospheric, it is utilized with from 0.5% to 4% of said catalyst by weight of said alkyl benzilate and that (2) when said pressure is atmospheric, it is utilized with from 8% to 15% of said catalyst by weight of said alkyl benzilate and (b) recovering the resulting alkyl phenylcyclohexylglycolate.

References Cited by the Examiner

UNITED STATES PATENTS

| | | | |
|---|---|---|---|
| 2,675,390 | 4/1954 | Rosenblatt | 260—667 |
| 2,730,544 | 1/1956 | Sahyun et al. | 260—473 |

OTHER REFERENCES

Biel et al.: J. Am. Chem. Soc. 74 (1952), p. 1487.

LORRAINE A. WEINBERGER, *Primary Examiner.*

S. B. WILLIAMS, *Assistant Examiner.*